United States Patent
Carlsson et al.

(10) Patent No.: US 6,381,457 B1
(45) Date of Patent: Apr. 30, 2002

(54) METHOD AND APPARATUS FOR DETERMINING IF A MOBILE STATION IS PRESENT IN AN AREA

(75) Inventors: Göran Carlsson, Odörtsgränd; Tomas Lundborg, Fridhemsgatan; Per-Arne Sandegren, Skånegatan, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/287,840

(22) Filed: Apr. 7, 1999

(30) Foreign Application Priority Data

Apr. 9, 1998 (SE) ................................................ 9801271

(51) Int. Cl.⁷ ................................................ H04Q 7/20
(52) U.S. Cl. .................. 455/435; 455/434; 455/426; 455/432; 455/436
(58) Field of Search .................. 455/435, 434, 455/432, 553, 552, 440, 439, 438, 436, 442, 465, 426

(56) References Cited

U.S. PATENT DOCUMENTS

| | | | |
|---|---|---|---|
| 5,255,307 A | * 10/1993 | Mizikovsky | 455/434 |
| 5,442,680 A | * 8/1995 | Schellinger et al. | 455/426 |
| 5,509,047 A | * 4/1996 | Uchikura | 455/426 X |
| 5,537,460 A | * 7/1996 | Holliday, Jr. et al. | 455/435 |
| 5,594,782 A | * 1/1997 | Zicker et al. | 455/417 |
| 5,745,850 A | * 4/1998 | Aldermeshian et al. | 455/417 |
| 5,839,071 A | * 11/1998 | Johnson | 455/440 |

FOREIGN PATENT DOCUMENTS

| | | |
|---|---|---|
| EP | 0563898 A2 | 10/1993 |
| GB | 2282735 A | 4/1995 |
| WO | WO 9633586 A1 | 10/1996 |

OTHER PUBLICATIONS

Hedman, P.; International–Type Search Report; Mar. 4, 1999; Search Request No. SE 98/00334; pp. 1–3.

* cited by examiner

Primary Examiner—Tracy Legree
(74) Attorney, Agent, or Firm—Jenkens & Gilchrist, P.C.

(57) ABSTRACT

A method and arrangement in a radio communication system for determining the presence of a mobile station in a determined area. A first radio channel is allocated for communication of control information and user data information between the mobile station and a first base station. The mobile station transmits identity information repeatedly on the first radio channel. A detecting unit receives at least one occurrence of the transmitted identity information. The mobile station is registered as present in the vicinity of the detecting unit upon receipt of said at least one occurrence of the identity information.

12 Claims, 6 Drawing Sheets

METHOD AND APPARATUS FOR DETERMINING IF A MOBILE STATION IS PRESENT IN AN AREA

TECHNICAL FIELD OF THE INVENTION

The invention relates to a method and an arrangement in a radio communication system in which a mobile station is operating. More in particular, the invention relates to a method and arrangement for determining if the mobile station is present in a specific area.

DESCRIPTION OF RELATED ART

A problem that often arises in connection with mobile stations operating in a radio communication system is to determine if a certain mobile station is present in a specific area. One example scenario where this problem occurs is where a home base station, i.e. a private base station which can be connected to the public telephone network, is installed in the home of a public cellular network subscriber and the subscriber, using his or her mobile station, prefers to communicate via the home base station while at home and within the radio coverage area of the home base station instead of via the cellular network.

GB 2 282 735 describes a communication system in which a user carries a handset which communicates either via a home base station connected to a telephone network or via a cellular network when away from the home base station. Apart from the facility to transmit data and analog signals for call connection, identification and traffic purposes in its cellular mode, the handset also transmits low power narrow bandwith signals which identify the user. When the user comes in close proximity with the home base station, the identity signals are received by the home base station and triggers a switch to a second operation mode in which incoming calls to the user are routed via the telephone network and the home base station.

A handset which, according to GB 2 282 735, transmits a low power identification signal in addition to transmitting call related signals need to be equipped with at least two transmitters which increases the complexity and cost of the handset.

Furthermore GB 2 282 735 discloses how incoming calls are routed via the telephone network and the home base station after a change to the second operation mode. There is no disclosure relating to handing off a call established in the cellular network to the home base station.

U.S. Pat. No. 5,260,988 describes a dual mode cellular cordless portable radiotelephone which may either operate in a cordless telephone system or a cellular network. The radiotelephone preferentially selects the cordless system when in range of this system.

When the radiotelephone is operating in idle mode, i.e. powered on but no call established, in the cellular network, the radiotelephone monitors a first control channel transmitted by a base station belonging to the cellular network. The radiotelephone temporarily stops monitoring the first control channel for a certain time period. During this time period the radiotelephone scans for radiosignals from the cordless system. If the cordless system is found, the radiotelephone moves to the cordless system, otherwise monitoring of the first control channel is resumed.

U.S. Pat. No. 5,260,988 also discusses handing off an established call from the cellular system to the cordless system. However, U.S. Pat. No. 5,260,988 neither discloses what triggers the radiotelephone to try and change to the cordless system, nor how the radiotelephone is able to maintain the established call while scanning for radiosignals from the cordless system.

SUMMARY OF THE INVENTION

The general problem dealt with by the present invention is detecting whether a specific mobile station is present in a determined area.

The problem is solved essentially by a method wherein the mobile station transmits information identifying the mobile station on a radio channel allocated for communication between the mobile station and a first base station. When a detecting unit receives the transmitted identity information, the mobile station is registered as present in a determined area. The solution includes the necessary means for implementing the method in the radio communication system.

More specifically, the problem is solved in the following manner. A first radio channel is allocated for communication of control information and user data information between the mobile station and the first base station. The mobile station transmits the identity information repeatedly on the first radio channel. The detecting unit receives at least one occurrence of the transmitted identity information. The mobile station is registered as present in the vicinity of the detecting unit upon receipt of said at least one occurrence of the identity information.

A general object of the present invention is to provide a method and an arrangement enabling a detecting unit to detect whether a specific mobile station is present in the vicinity of the unit.

A more specific object of the invention is to provide such a mobile station presence detection method and arrangement which do not require the mobile station to include more than one transmitter.

Still another object is to provide a hand off method and arrangement wherein hand off of the mobile station from said first base station to a second base station is triggered when, using said mobile station presence detection method, the mobile station is detected as present within the coverage area of the second base station.

One advantage afforded by the invention is that it provides a mobile station presence detection method and arrangement which do not require the mobile station to include more than one transmitter.

Another advantage is that the invention enables a selective hand off method and arrangement wherein the decision to trigger hand off of a selected mobile station, communicating with a first base station in a first radio communication network, to a second base station, separate from the first radio communication network, is transparent to the mobile station and the first radio communication.

The invention will now be described in more detail with reference to exemplifying embodiments thereof and also with reference to the accompanying drawings.

DETAILED DESCRIPTION OF THE EMBODIMENTS

Figure 1:
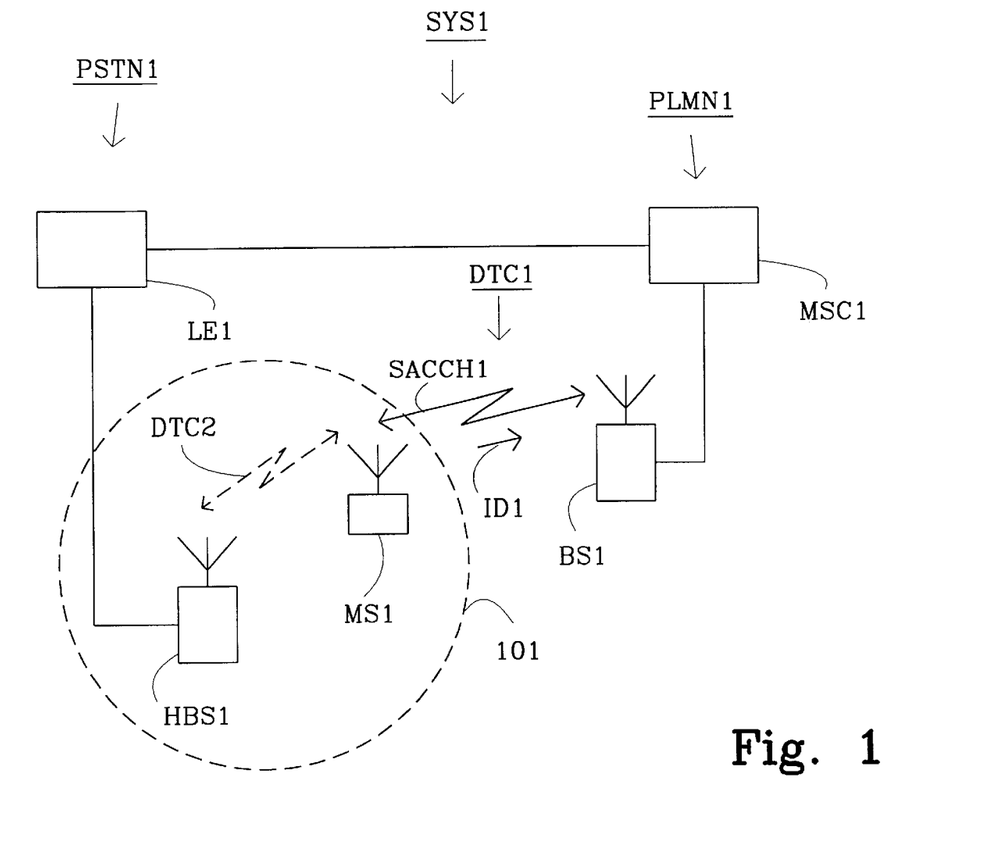
FIG. 1 illustrates a view of a first radio communication system comprising a home base station.

FIG. 1 illustrates part of a radio communication system according to a first exemplifying embodiment of the invention.

The radio communication system SYS1 comprises a public cellular network PLMN1 and a public telephone network PSTN1. The cellular network PLMN1 comprises a mobile services switching centre MSC1 to which a first base station BS1 is connected.

The radio communication system SYS1 further comprises a home base station HBS1. In this exemplifying embodiment, the home base station HBS1 is installed in the home of a cellular network subscriber. The home base station HBS1 is connected to a local exchange LE1 in the public telephone network PSTN1. The telephone network PSTN1 and the cellular network PLMN1 are interconnected with each other and enable communication, e.g. phone calls, between subscribers operating in the respective network. The radio communication system SYS1 further comprises a mobile station MS1 which enables the cellular network subscriber to communicate e.g. by initating and receiving phone calls.

The home base station HBS1, which alternatively may be referred to as a personal base station, provides radio coverage within a certain area 101 at the cellular subscribers home location. The home base station HBS1 and the first base station BS1 in FIG. 1 both support the same radio interface, which simplifies the design of the mobile station MS1. In this examplifying embodiment the radio interface according to the TIA/EIA IS-136 specifications is used.

While the cellular subscriber uses his mobile station MS1 within the coverage area 101 of the home base station HBS1, communication should preferably be handled via the home base station HBS1 by the telephone network PSTN1 instead of by the cellular network PLMN1. Hence, the radio communication system SYS1 must be able to detect the presence of the mobile station MS1 within the coverage area 101 of the home base station HBS1. The present invention addresses this presence detection problem.

Figure 2A:
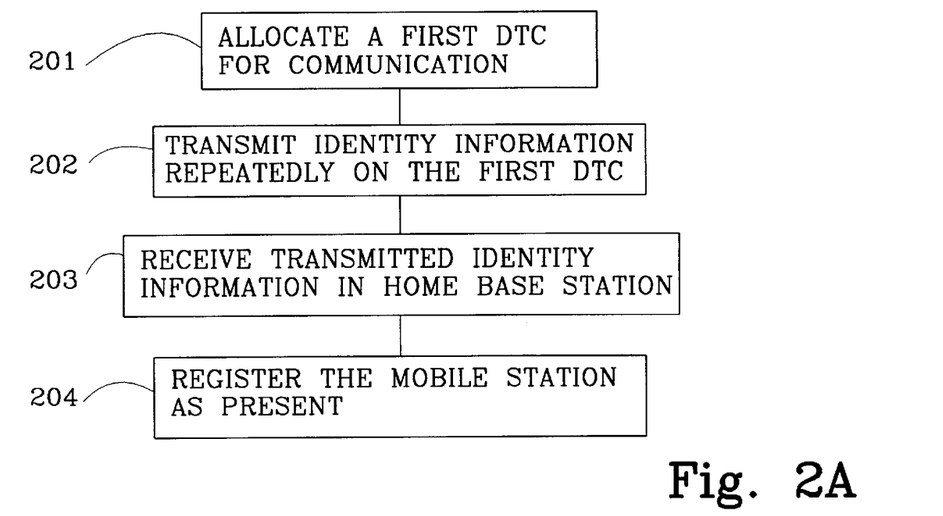
FIG. 2A is a flowsheet illustrating a mobile station presence detection method according to one embodiment of the present invention.

FIG. 2A is a flowsheet which illustrates a method according to the invention for detecting when the mobile station MS1 is present in the vicinity, i.e. within the radio coverage area 101, of the home base station HBS1.

At step 201 in FIG. 2A, a first digital traffic channel (DTC) is allocated dedicated for communication between the mobile station MS1 and the first base station BS1. The mobile station MS1, the first base station BS1 and the mobile services switching centre MSC1 interact in a well known way when performing the channel allocation. The channel allocation may occur due to a phone call from or to a second party being received or intiated by the mobile station MS1 while operating in the area (cell) served by the first base station BS1. The channel allocation may also be due to a hand off of an already established call. The digital traffic channel DTC1 is a bidirectonal channel. In the downlink direction, i.e. from the first base station BS1 to the mobile station MS1, the channel is called a forward digital traffic channel (FDTC) and in the uplink direction, i.e. from the mobile station MS1 to the first base station BS1, the channel is called a reverse digital traffic channel (RDTC).

The digital traffic channel DTC1 is used to transfer user data information, such as speech or facsimile, and control information, i.e. signalling information.

The digital traffic channel comprises a portion called a slow associated control channel (SACCH) SACCH1. The slow associated control channel SACCH1 is used in the uplink direction to transfer channel quality messages (CQM) reporting the results of measurements performed by the mobile station MS1 on the allocated digital traffic channel DTC1 as well as measurements made on signals from other base stations in the cellular network PLMN1.

Figure 9:
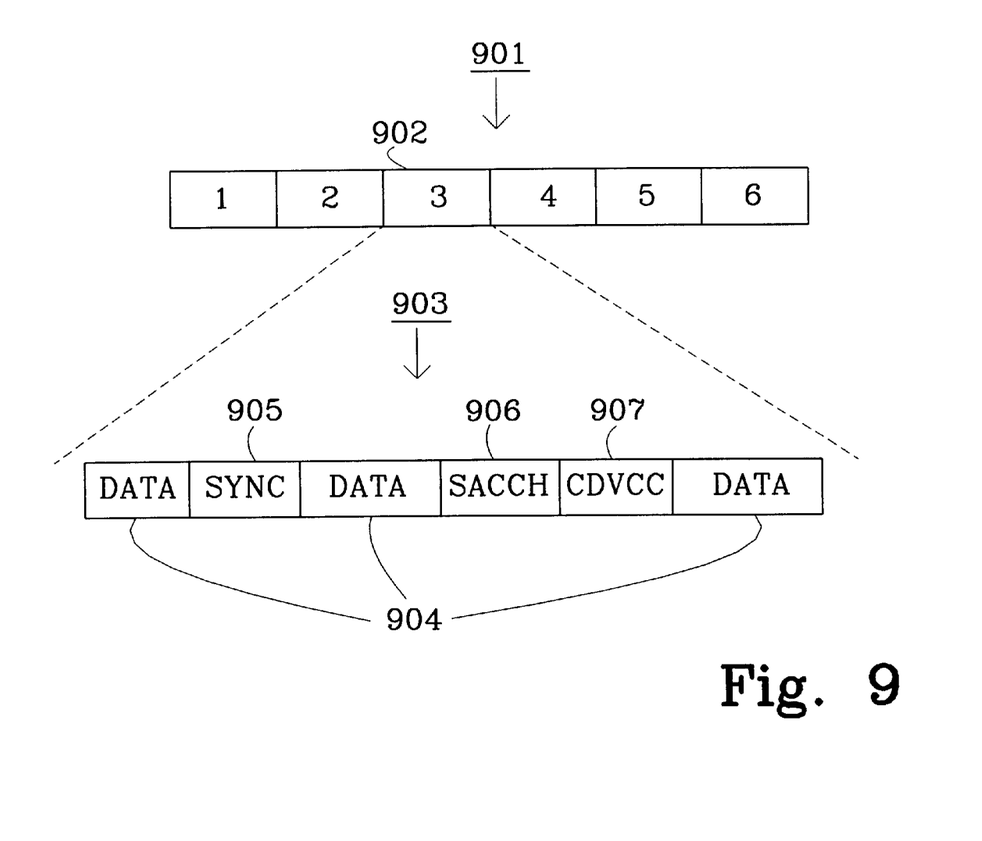
FIG. 9 is a block diagram illustrating the structure of a digital traffic channel.

FIG. 9 illustrates the structure of a digital traffic channel according to the TIA/EIA IS-136 specifications. A TDMA-frame 901 contains six time slots 902 of which two slots are assigned to each digital traffic channel. In one time slot for the uplink direction a burst 903 comprising a number of fields is transmitted. The burst 903 comprises three data fields 904, a sync field 905, a slow associated control channel field 906 and a coded digital verification color code field 907. The data fields 904 are used to convey the user data information while the slow associated control channel field 906 is used to convey the slow associated control channel messages. For transmission of each slow associated control channel message, a number of bursts 903 are used.

At step 202 in FIG. 2A, the mobile station MS1 starts to repeatedly transmit information identifying itself on the slow associated control channel SACCH1 portion of the first digital traffic channel DTC1. The identity information is sent in identity messages ID1 that are inserted in the stream of messages on the slow associated control channel SACCH1 at a predetermined rate, e.g. once every ten seconds.

At step 203, the home base station HBS1 receives at least one occurrence of the identity messages transmitted by the mobile station MS1. The home base station HBS1 scans for radio transmissions belonging to the allocated first digital traffic channel DTC1 in the radio frequency band used for reverse digital traffic channels in the cellular network PLMN1. Each time the home base station HBS1 detects a reverse digital traffic channel, it monitors that channel until it either has received and correctly decoded at least one identity message or it has monitored the channel long enough to conclude that no identity messages are transmitted on that channel. When an identity message has been received, the home base station HBS1 compares the content of that message with previously stored identity information identifying the mobile station MS1 as attached to the home base station HBS1. If the received identity does not match the stored identity, the home base station HBS1 continues the scan for the allocated first digital traffic channel DTC1.

If the received identity matches the stored identity, the home base station HBS1 registers at step 204 the mobile station MS1 as present in the vicinity of the home base station HBS1.

Figure 3:
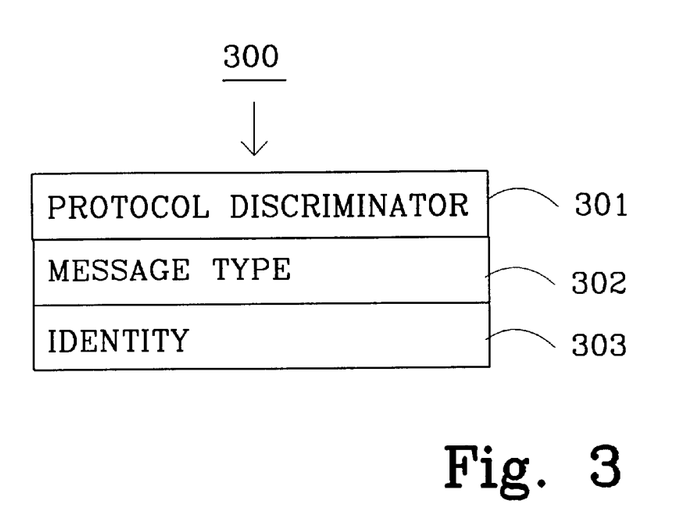
FIG. 3 is a block diagram illustrating the structure of transmitted identity messages.

FIG. 3 is a block diagram illustrating the structure of the transmitted identity messages. Like all other TIA/EIA IS-136 messages transmitted on the slow associated control channel, the identity message 300 comprises a 2 bit protocol discriminator field 301 and a 8 bit message type field 302. The identity message 300 also contains an identity field 303. The identity field 303 illustrated in FIG. 3 consists of 30 bits. The home base station HBS1 generates a 30 bit random identity which is stored in both the home base station HBS1 and the mobile station MS1. As a person skilled in the art realizes there are several other ways of selecting the identity information used in the context of the present invention. Other examples includes, but are not limited to, mobile station identity number (MIN), international mobile subscriber identity (IMSI) or international mobile station equipment identity (IMEI).

In the just discussed mobile station presence detection method, the home base station HBS1 functions as a mobile station presence detector. Alternatively, the home base station HBS1 can be regarded as comprising such a mobile station presence detector.

Figure 2B:
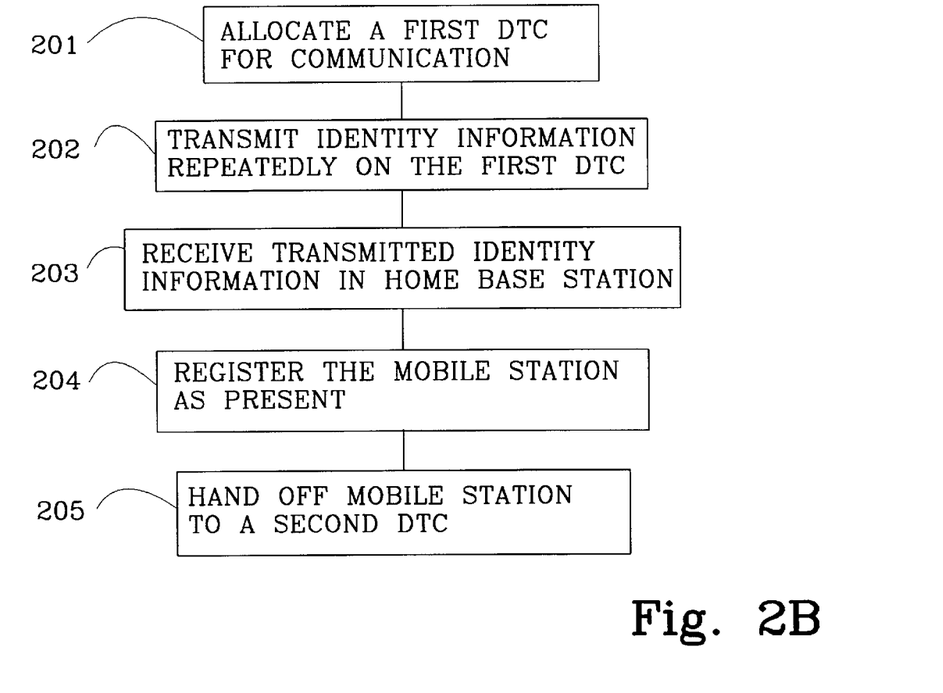
FIG. 2B is a flowsheet illustrating a handoff method comprising the mobile station presence detection method illustrated in FIG. 2A.

The flowsheet in FIG. 2B illustrates a hand off method according to the invention implemented in the radio communication system SYS1 of FIG. 1. The mobile station MS1 is handed off from the first base station BS1 in the cellular network PLMN1 to the home base station HBS1 when the mobile station MS1 is within the radio coverage area 101 of the home base station HBS1.

In this hand off method, the presence of the mobile station MS1 within the radio coverage area 101 of the home base station HBS1 is detected according to the above described inventive method, i.e. the hand off method is initiated by performing the method steps 201–204 illustrated in FIG. 2A.

Step 204, where the received identity is determined as matching the identity stored in the home base station HBS1, also implies that the mobile station MS1 is determined as being a mobile station which should preferably communicate with the home base station HBS1 when within the range of said home base station HBS1. In this examplifying embodiment only the mobile station MS1 is attached to the home base station HBS1, but in other embodiments there may be several mobile stations attached to a home base station forming a set of mobile stations which preferably should communicate with the home base station when within range of the home base station.

At step 205, hand off is performed of the mobile station MS1 from the first digital traffic channel DTC1 to a second digital traffic channel DTC2 for communication of control information and user data information between the home base station HBS1 and the mobile station MS1.

The handoff is carried out as follows. The home base station HBS1 initiates a dialup modem connection via the telephone network PSTN1 to a home base station server within the mobile services switching centre MSC1. The home base server acts as an interface enabling interaction between the home base station HBS1 and the mobile services switching centre MSC1. On said dialup modem connection, the home base station HBS1 sends a request to the mobile services switching centre MSC1 for hand off to the second digital traffic channel DTC2 on a radio frequency which previously has been assigned for use within the home base station HBS1. Assignment of the radio frequency to the home base station HBS1 can e.g. be performed as described in U.S. Pat. No. 5,428.668. The mobile services switching centre MSC1 acknowledges the request which triggers the home base station HBS1 to initiate transmission on the second digital traffic channel DTC2. The mobile services switching centre MSC1 orders the first base station BS1 to transmit a hand off order to the mobile station MS1, ordering the mobile station MS1 to tune to the second digital traffic channel DTC2. The mobile station MS1 tunes to the second digital traffic channel DTC2 and continues to transmit and receive user data information and control information on this traffic channel DTC2. When the home base station HBS1 detects the mobile station MS1 on the second digital traffic channel DTC2, it informs the mobile services switching centre MSC1 that the handoff was successful. The mobile services switching centre MSC1 merges the connection from the second party and the connection with the home base station HBS1, and the continued conversation between the cellular network subscriber and the second party is carried by this merged connection. The mobile services switching centre orders the first base station BS1 to release the first digital traffic channel (DTC1).

The mobile services switching centre MSC1 may indicate in the reply to the hand off request from the home base station HBS1 that instead of the radio frequency proposed by the home base station HBS1, another frequency should be used for the second digital traffic channel DTC2.

The home base station HBS1, the mobile services switching centre MSC1, the first base station BS1 and the mobile station MS1 interacts with each other when performing the hand off as described above and may thus collectively be regarded as a means for handing off the mobile station MS1 to the second digital traffic channel DTC2.

Figure 4:
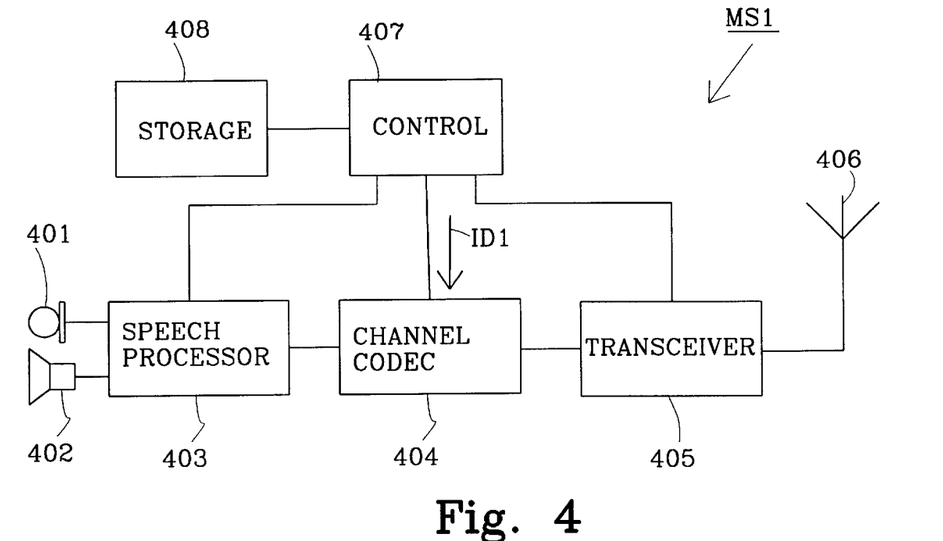
FIG. 4 is a block diagram illustrating one embodiment of a mobile station according to the present invention.

FIG. 4 illustrates a schematic block diagram of the mobile station MS1. Blocks which are needed only when operating on analog traffic channels have not been included in FIG. 4.

The mobile station MS1 comprises a microphone 401 and an earphone 402 connected to a speech processor 403. The speech processor 403 performs analog-to-digital and digital-to-analog conversion as well as speech coding and decoding. The speech processor 403 is connected to a channel codec 404. The channel codec 404 performs channel coding and channel decoding as well as interleaving and deinterleaving. The channel codec 404 is connected to a transceiver 405 comprising a radio transmitter and a radio receiver. The transceiver 405 is connected to an antenna 406. A control processor 407 is responsible for the overall control of the mobile station MS1 and thus is connected to and controls the speech processor 403, the channel codec 404 and the transceiver 405. A storage unit 408 provides storage of program instructions for execution by the control processor 407 as well as data used when executing said program instructions.

When, as illustrated in FIG. 1, the mobile station MS1 is communicating with the first base station BS1 over the first digital traffic channel DTC1, the control processor 407 provides the channel codec with a stream of messages to be transmitted on the slow associated control channel SACCH1. In this stream of messages, the control processor 407 inserts identity information messages ID1 according to the format illustrated in FIG. 3.

The mobile station identity is held in the storage unit 408 which is updated each time the mobile station MS1 is charged by the home base station HBS1.

The control processor 407, the channel codec 404 and the transceiver 405 may collectively be regarded as a transmission means for repeated transmission of identity messages ID1, i.e. information identifying the mobile station MS1, on the allocated first digital traffic channel DTC1.

Apart from the above described provisions for transmitting identity messages, the mobile station MS1 is similar to other TIA/EIA IS-136 compliant mobile stations well known to a person skilled in the art.

Figure 5:
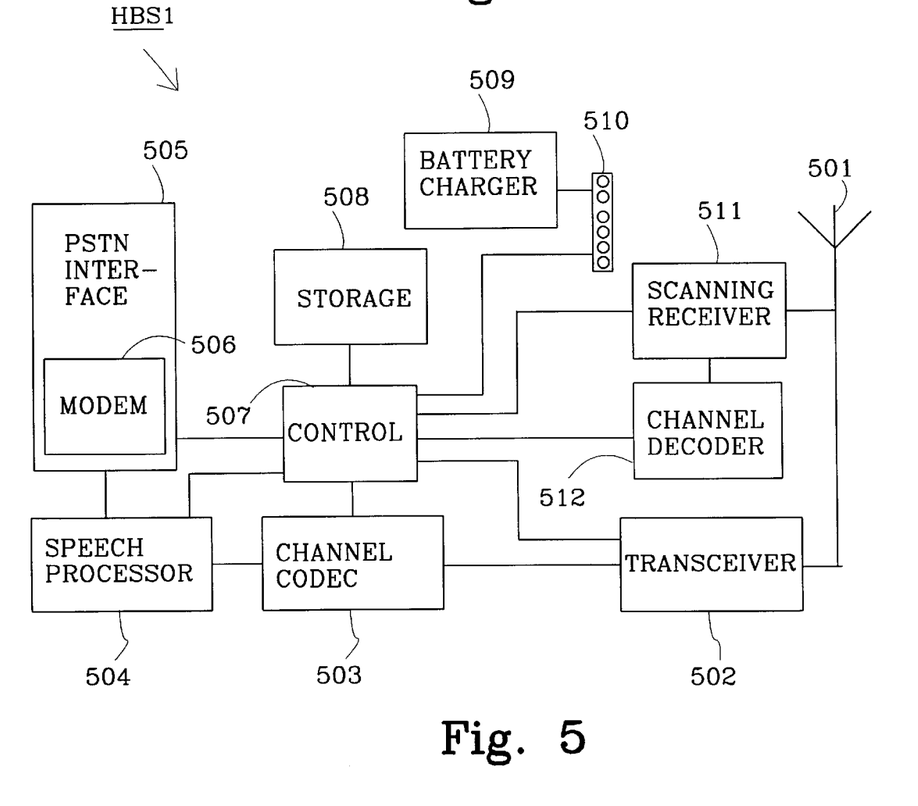
FIG. 5 is a block diagram illustrating a home base station.

FIG. 5 illustrates a schematic block diagram of the home base station HBS1.

The home base station HBS1 comprises an antenna 501 to which a transceiver 502, comprising a radio receiver and a radio transmitter, is connected. A channel codec 503 is connected to the transceiver 502 and is in turn connected to a speech processor 504. The channel codec 503 and the speech processor 504 performs similar functions as the channel codec 404 and speech processor 403 in the mobile station MS1 illustrated in FIG. 4.

The speech processor 504 is connected to a PSTN interface 505 which comprises a modem 506. The PSTN interface 505 is used to connect the home base station HBS1 to the telephone network PSTN1 in FIG. 1 and provides functions enabling the home base station HBS1 to interact with the telephone network PSTN1 and the mobile services switching centre MSC1 in the cellular network PLMN1.

A control processor 507 is responsible for the overall control of the home base station HBS1 and is connected to and controls the other units 502–506. A storage unit 508 provides storage of program instructions for execution by the control processor 507 as well as data used when executing said program instructions. The home base station HBS1 also comprises a battery charger 509 connected to an electrical connector 509. The control processor 507 is also connected to the electrical connector 510.

When the mobile station MS1 in FIG. 1 is connected to the electrical connector 509, the battery charger 509 charges the mobile station MS1.

Further details on the aspects of the home base station HBS1 described thus far can be found in U.S. Pat. No. 5,428,668. Said base station is more specifically discussed under reference to FIGS. 2–3 of that specification. These common aspects will not be elaborated upon any further in this disclosure.

Each time the mobile station MS1 in FIG. 1 is connected to the electrical connector 510, the control processor 508 generates a new 30 bit random identity and transfers this identity to the mobile station MS1 via the electrical connector 510. The new 30 bit random identity is stored in both the mobile station MS1 as well as the storage unit 508 and replaces any previously stored random identities.

In addition to those units illustrated in FIG. 4 and discussed above, the home base station HBS1 further comprises a scanning receiver 511 connected to the antenna 501 and a channel decoder 512. Both the scanning receiver 511 and the channel decoder 512 are connected to and controlled by the control processor 507.

When performing method step 203 in FIGS. 2A and 2B, the control processor 507 determines a set of frequencies where radio transmissions potentially belonging to the allocated traffic channel DTC1 in FIG. 1 may occur. This set of frequencies may e.g. include all the frequencies potentially used in the radio communication system SYS1 for reverse digital traffic channels. The control processor 507 then orders the scanning receiver 511 to tune to each of these frequencies in turn. The scanning receiver 511 measures the received signal strength. If this signal strength is above a defined threshold, the control processor 507 orders the channel decoder 512 to perform channel decoding and deinterleaving on the output from the scanning receiver 511. The control processor 507 analyses the output from the channel decoder 512. If the control processor 507 determines that no reverse digital traffic channel with a signal strength above the defined threshold has been found, the control processor 507 orders the scanning receiver 511 to tune to the next frequency in said set of frequencies. If a reverse digital traffic channel has been found, the control processor 507 continues to monitor the output data from the channel decoder 512 until it determines that an identity message has been received or the current reverse digital traffic channel has been monitored for a time period long enough to ensure that no identity messages are transmitted on this channel. If no identity message was found, the control processor 507 orders the scanning receiver 511 to tune to the next frequency in said set of frequencies.

If an identity message was found, the control processor 507 compares the content of the received identity message with the random identity previously stored in the storage unit 508.

If the received identity does not match the stored identity, the control processor 507 orders the scanning receiver 511 to tune to the next frequency in said set of frequencies.

If the received identity matches the stored identity, the control processor 507 concludes that the mobile station MS1 attached to the home base station HBS1 is within the radio coverage area 101 of the home base station HBS1.

When the control processor 507 has detected the mobile station MS1 within the radio coverage area 101 of the home base station HBS1, the home base station HBS1 proceeds to trigger a hand off of the mobile station MS1 as described previously when discussing method step 205 in FIG. 2B. During the handoff process, the control processor 507 exchanges signalling information with the mobile services switching centre MSC1 via the modem 506.

Instead of having a separate channel decoder 512 connected to the scanning receiver 511, the channel codec 503 may be adapted to perform channel decoding and deinterleaving also for the output from the scanning receiver 511.

The control processor 507, the scanning receiver 511 and the channel decoder 512 may collectively be regarded as a receiving means for receiving identity information transmitted by the mobile station MS1.

The control processor 507 may be regarded as a registering means for registering the mobile station MS1 as present in the vicinity of the home base station HBS1 upon receipt of said identity information transmitted by the mobile station MS1. The control processor 507 may also be regarded as a means for determining that the mobile station MS1 is attached to the home base station HBS1 and thus should preferably communicate via the home base station HBS1 instead of the first base station BS1.

In addition to the exemplifying embodiment of the invention described above, there are several other possible embodiments of the current invention.

Instead of repeatedly transmitting mobile station identity information on a slow associated control channel, this information may be transmitted on a fast associated control channel (FACCH).

As a person skilled in the art appreciates, a home base station may be connected to other types of public wireline networks than a public telephone network as illustrated in FIG. 1. One such alternative network would be an Integrated Digital Services Network (ISDN). The network to which the home base station is connected may either use a connection oriented mode of information transfer, e.g using circuit switched connections or ATM virtual channels, or a connectionless mode of information transfer, e.g. using the User Datagram Protocol (UDP) There are several other possible applications for the inventive mobile station presence detection method than as a means of triggering hand off to a home base station.

One alternative application would be to use the mobile station presence detection method to trigger hand off of mobile stations, attached to a wireless office system, from a public cellular network to the wireless office system.

Figure 6:
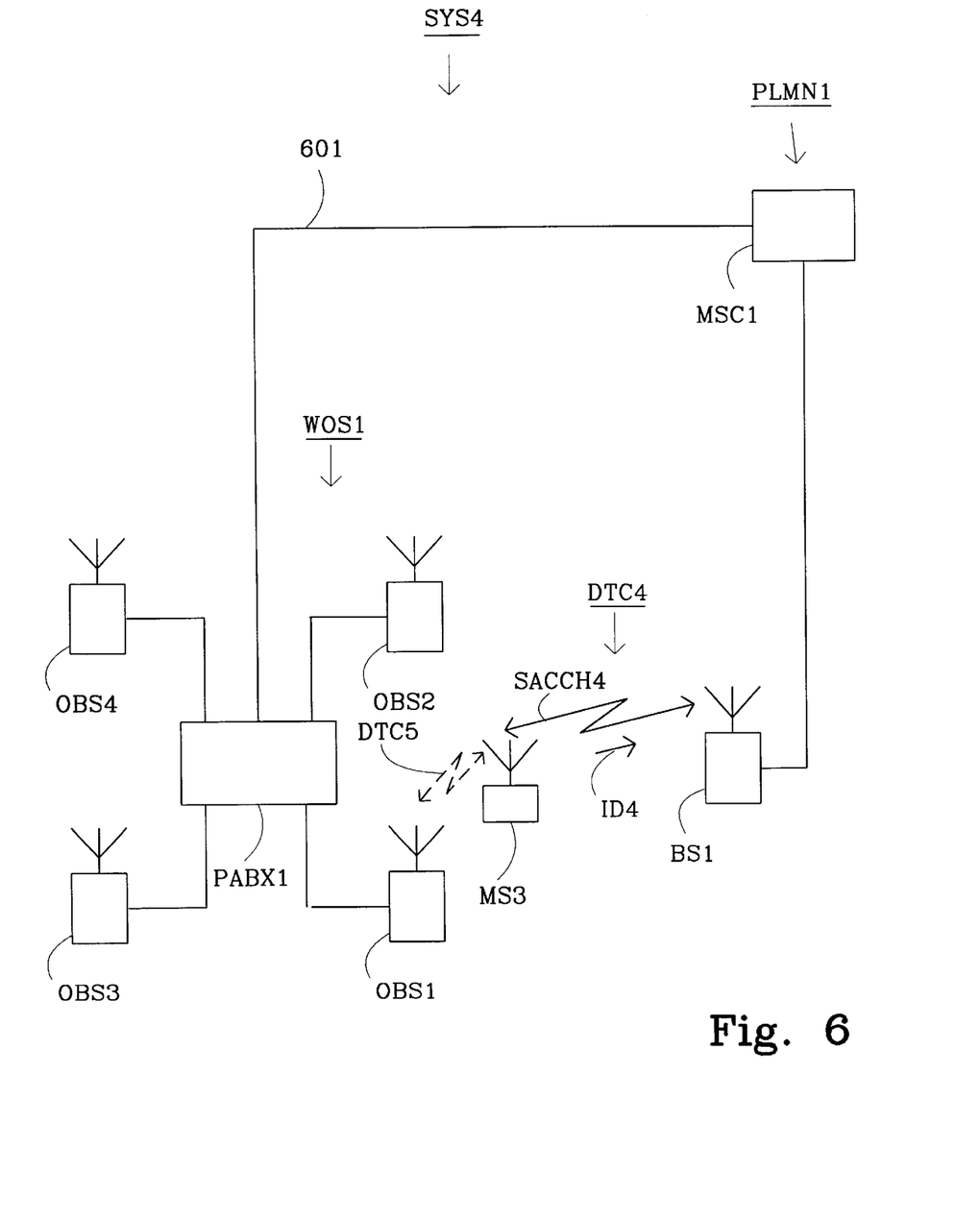
FIG. 6 is a view illustrating a second radio communication system comprising a wireless office system

In FIG. 6 a radio communication system SYS4 is illustrated as comprising the cellular network PLMN1 from FIG. 1, a mobile station MS3 and a wireless office system WOS1 comprising a private automatic branch exchange (PABX) PABX1 to which a number of base stations OBS1-OBS4 are connected. The PABX PABX1 is connected to the mobile services switching centre MSC1 via a trunk line 601.

In this examplifying embodiment of the invention, a similar handoff method as the handoff method illustrated in FIG. 2B is used for handoff of mobile stations, attached to the wireless office system WOS1, from the cellular network PLMN1 to the wireless office system WOS1 as soon as they come within the range of any one of the base station OBS1-OBS4 belonging to the wireless office system. In FIG. 6 the mobile station MS3, which initially is communicating with the first base station BS1 in the cellular network PLMN1 and transmitting identity messages ID4 on a slow associated control channel portion SACCH4 of a first digital traffic channel DTC4, is handed off to a second digital traffic channel DTC5 for communication with a second base station OBS1 belonging to the wireless office system WOS1. In this examplifying embodiment of the invention, each base station OBS1-OBS4 belonging to the wireless office system WOS1 is provided with a list of identities of the mobile stations attached to the wireless office system WOS1 from the PABX PABX1 which manages a master copy of this list of attached mobile stations. The base stations OBS1 scans for mobile stations attached to the wireless system WOS1 which are communicating with base stations in the cellular network PLMN1. When an attached mobile station, using the inventive presence detection method, is detected within the coverage area of one of the base stations OBS1-OBS4 said base station informs the PABX PABX1 of this fact. The PABX PABX1 sends a handoff request to the mobile services switching centre MSC1 and handoff is performed in a similar way as previously described. Note however that the signalling exchange and the continued communication of user data information is carried by the trunk line 601 interconnecting the PABX PABX1 and the mobile services switching centre MSC1 instead of via a dialup connection.

The mobile station MS3 functions essentially as the mobile station MS1 illustrated in FIG. 4. The mobile station MS3 in this example scenario however receives a 30 bit random identity each time it registers with the wireless office system WOS1. The PABX PABX1 upon detecting that the mobile station MS3 has entered the service area of the wireless office system WOS1, generates the random identity, sends this new identity in an identity message (see FIG. 3) to the mobile station MS3 via the base station which detected the mobile station MS3, updates the master copy of the list of attached mobile stations with this new random identity and distributes this new identity also to its attached base stations OBS1-OBS4.

Figure 7:
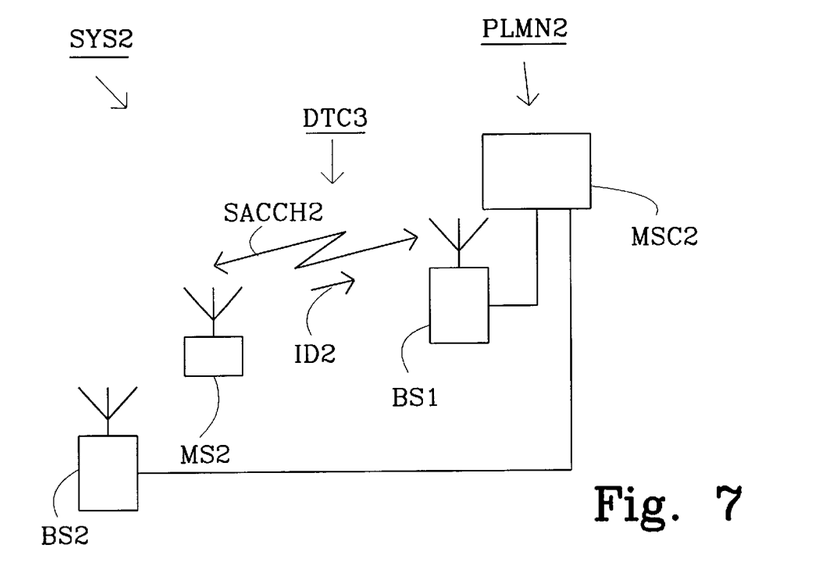
FIG. 7 is a view illustrating a third radio communication system comprising a home presence detector.

Another application would be to use the mobile station presence detection method, not to trigger hand off, but instead to verify the presence of a certain mobile station within a handoff candidate cell. Such an application is illustrated in FIG. 7. FIG. 7 shows a radio communication system SYS2 comprising a cellular network PLMN2 together with a mobile station MS2. The cellular network PLMN2 is illustrated as comprising a mobile services switching centre MSC2 to which a first base station BS1 and a second base station BS2 is connected. A first digital traffic channel DTC3 is allocated dedicated for communication between the mobile station MS2 and the first base station BS1. The mobile station MS2 is repeatedly transmitting identity messages ID2 comprising information identifying the mobile station MS2 on a slow associated control channel portion SACCH2 of the first digital traffic channel DTC3. In this alternative application of the invention the identity information transmitted is selected as a Temporary Mobile Station Identity (TMSI) which is dynamically assigned by the cellular network PLMN2 to the mobile station MS2. The mobile station MS2 performs measurements on the first digital traffic channel DTC3 and on radiosignals from other base stations, including the second base station BS2 and reports the results of these measurements to the first base station BS1. As the mobile station MS2 approaches the second base station BS2 the signal strength of the first digital traffic channel DTC3 decreases while the signal strength of the signals from the second base station BS2 increases. The first base station BS1 evaluates the results reported from the mobile station as well as results of its own measurements on the first digital traffic channel DTC3. When a handoff trigger criterion is fulfilled, the first base station BS1 sends a handoff request message to the mobile services switching centre MSC2, identifying the second base station BS2 as the primary target for a hand off. The mobile services switching centre MSC2 sends a verification request message to the second base station BS2 ordering the second base station BS2 to verify that the second base station BS2 can receive the transmissions from the mobile station MS2 on the uplink of the first digital traffic channel DTC3.

In the prior art this verification is known to be performed by tuning to the uplink portion of the first digital traffic channel DTC3, i.e. to the frequency and time slot on which the mobile station MS2 is transmitting when communicating on the first digital traffic channel DTC3, and in the target base station measure and evaluate the decoded digital verification color code, the received signal strength and the received burst quality.

In the base station BS2 illustrated in FIG. 7 these prior art tests are supplemented by the inventive mobile station presence detection method. The verification request sent from the mobile services switching centre MSC2 comprises information defining the first digital traffic channel DTC3, i.e. frequency and timeslot information, and the temporary mobile station identity assigned to the mobile station MS2. The base station BS2 tunes a radio receiver in the second base station BS2 according to the provided information defining the first digital traffic channel DTC3 and tries to receive identity messages transmitted by the mobile station MS2. If the base station BS2 succeeds in receiving at least one occurrence of an identity message ID2 containing a temporary mobile station identity matching the identity assigned to the mobile station MS2, the second base station BS2 concludes that the received radio signal is transmitted by the mobile station MS2 and returns a verification result message to the mobile services switching centre indicating that the mobile station MS2 has been detected to be present in the vicinity of the second base station BS2.

Figure 8:
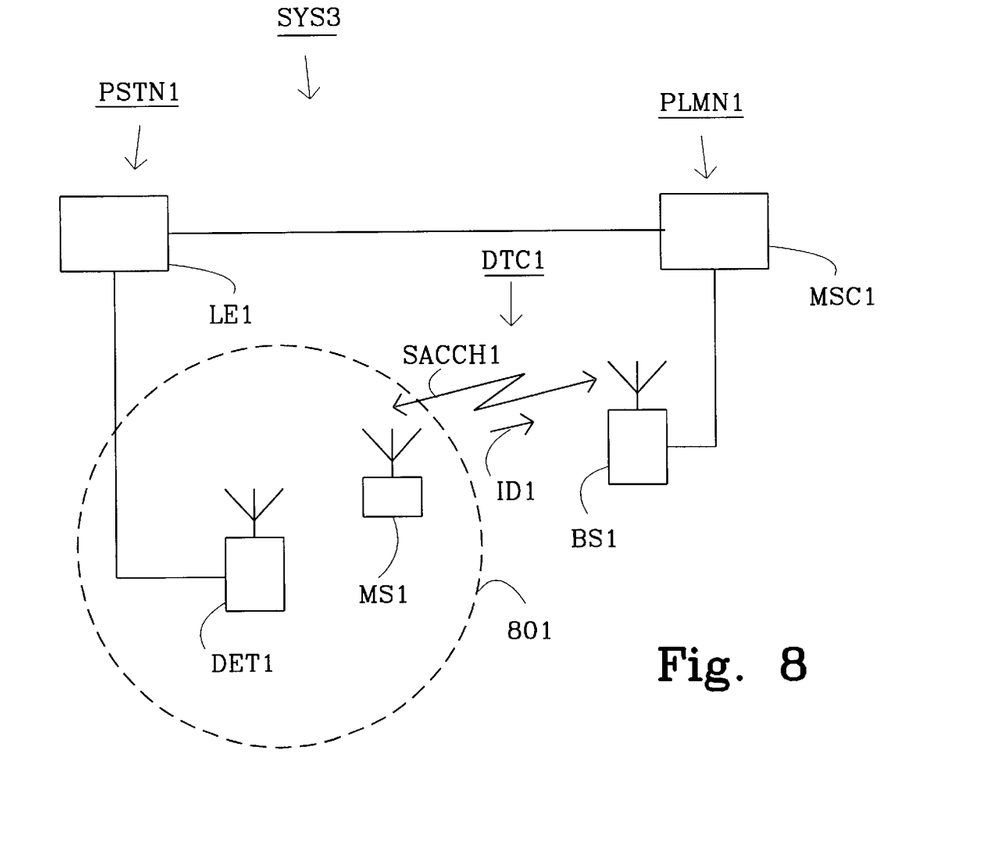
FIG. 8 is a view illustrating a fourth radio communication system comprising a cellular network.

Yet another application of the invention is illustrated in FIG. 8. The radio communication system SYS3 illustrated in FIG. 8 comprises the public cellular network PLMN1, the public telephone network PSTN1 and the mobile station MS1 from FIG. 1. In the radio communication system SYS3 in FIG. 8, the home base station HBS1 in FIG. 1 has been replaced by a home presence detector DET1. The idea behind this arrangement is that when the cellular network subscriber uses his mobile station MS1 to communicate while at home, communication is still handled by the cellular network PLMN1 but the cellular network subscriber will get a discount, i.e. lower air time charges.

The presence of the mobile station MS1 in the vicinity of the home presence detector DET1 is detected using a similar method as the one illustrated in FIG. 2A wherein the home presence detector DET1 in FIG. 8 replaces the home base station HBS1 in FIG. 1. When the home presence detector DET1 registers the mobile station MS1 as present in the vicinity of the home presence detector DET1, i.e. within the area illustrated as a dashed circle 801 in FIG. 7, the home presence detector DET1 registers the time when it detected the mobile station MS1 as present, i.e. the time when it received a first occurrence of the identity information ID1 transmitted by the mobile station MS1 on the first digital traffic channel DTC1. The home presence detector DET1 continues to monitor the first digital traffic channel DTC1 for further repetitions of the identity information ID1 until it decides that the first digital traffic channel DTC1 has been released or that the mobile station MS1 has moved away from the vicinity of the home presence detector DET1, i.e. the mobile station MS1 has moved outside the area 801. The home presence detector MS1 registers the reception time of the last received repetition of the identity information ID1. The home presence detector DET1 initiates a dial up modem connection via the telephone network PSTN1 to the mobile services switching centre MSC1 and transfers a message to the mobile services switching centre MSC1 informing it of the reception times of the first and last received occurrence of the identity information ID1. The mobile services switching centre MSC1 stores this information.

When billing the cellular network subscriber, the air time charges are reduced in accordance with the stored information on when the cellular network subscriber has been at home while communicating.

The home presence detector DET1 comprises a subset of those blocks illustrated in FIG. 5, i.e. blocks 501, 505–512, which functions essentially as previously described when generating the 30 bit random identity and detecting the presence of the mobile station MS1. When the mobile station MS1 has been detected communicating in the vicinity of the home presence detector DET1, the home presence detector DET1 proceeds to register the time of receiving the first and the last occurrence of the identity message ID1 on the first digital traffic channel DTC1. The home presence detector DET1 then initiates a dialup modem connection to the mobile services switching centre MSC1 and transfers reception times of the first and last received occurrence of the identity information ID1 together with the subscriber number of the cellular network subscriber.

Instead of initiating a dialup modem connection and transfering a message to the mobile services switching centre MSC1 each time the home presence detector DET1 detects the mobile station MS1 communicating within the area 801, the home presence detection DET1 may store information relating to a number of communication occurences within the area 801 and send a single message to the mobile services switching centre MSC1 conveying this stored information. This single message may e.g. be sent once each night.

As a person skilled in the art appreciates, there are several other possible ways for a home presence detector to communicate with a mobile services switching centre than via a telephone network as illustrated in FIG. 8. The home presence detector may of course be connected to and communicate via another type of wireline network, such as e.g. an Integrated Digital Services Network (ISDN). The home presence detector may also communicate with the mobile services switching centre using radio communication such as e.g. mobitex or Cellular Digital Packet Data (CDPD).

The inventive mobile station presence detection method can of course be supplemented with other mobile station positioning determining methods, such as time difference of arrival, in order to determine a more exact position of a mobile station.

The invention is of course not restricted to be used only in TIA/EIA is-136 compliant radio communication systems, but may also be used in connection with other air interface specifications such as global systems for mobile communication (GSM), personal digital cellular (PDC) or TIA/EIA is-95.

What is claimed is:

1. A mobile station presence detection method in a radio communication system, comprising a first base station and a mobile station, the method comprising the steps of:

allocating a first radio channel for communication of control information and user data information between the mobile station and the first base station;

transmitting information identifying the mobile station repeatedly in a portion of the first radio channel used for transmission of the control information;

providing information defining the allocated first channel; and receiving at least one occurrence of the transmitted identity information at a second base station; and registering the mobile station as present in a determined area upon receipt of said at least one occurrence of the transmitted identity information at the second base station.

2. A method according to claim 1, wherein: said information identifying the mobile station is transmitted in a slow associated control channel portion of said first radio channel.

3. A method according to claim 1 wherein said step of receiving at least one occurrence of the transmitted identity further includes the step of:

scanning for radio transmissions belonging to the allocated first radio channel in at least a subset of a radio frequency band used in the radio communication system.

4. A method according to claim 1 wherein said step of receiving at least one occurrence of the transmitted identity further includes the steps of:

providing information defining the allocated first channel; and tuning a radio receiver according to the provided defining information in order to receive said at least one occurrence of the transmitted identity information.

5. A method according to claim 1 wherein said radio communication system further includes a second base station, and the method further includes the steps of:

determining whether the mobile station is one of a set of at least one mobile stations which preferably should communicate with the second base station instead of with the first base station upon determining the mobile station as present within the coverage area of the second base station; and handing off the mobile station from said first radio channel to a second radio channel for communication of control information and user data information between the second base station and the mobile station, subsequent to determining the mobile station as being included in said set of mobile stations.

6. A radio communication system, a mobile station and a mobile station presence detector wherein the radio communication system is configured to allocate a first radio channel for communication of control information and user data information between the mobile station and a first base station, the radio communication system comprising:

a mobile station configured to repeatedly transmit identity information identifying the mobile station in a portion of a first radio channel that is further used for transmission of control information; and a mobile station presence detector located at a second base station comprising:

a receiver configured to receive at least one occurrence of the transmitted identity information; and a register configured to register the mobile station as present in the vicinity of the mobile station presence detector upon receipt of the identity information by the receiver.

7. A radio communication system according to claim 6 wherein the mobile station is further configured to transmit said identity information in a slow associated control channel portion of said first radio channel.

8. A radio communication system according to claim 6 wherein:

the receiver of the mobile station presence detector is further configured to scan for radio transmissions belonging to the allocated first radio channel in at least a subset of a radio frequency band used in the radio communication system in order to receive said at least one occurrence of the transmitted identity information.

9. A radio communication system according to claim 6 further comprising:

an information unit configured to provide the mobile station presence detector with information defining the allocated first radio channel; and wherein the receiver is further configured receive the provided defining information.

10. A radio communication system according to claim 6, further comprising:

a second base station, wherein said mobile station presence detector is included within said second base station;

a determination unit configured to determine if the mobile station is one of a set of at least one mobile stations configured to communicate via the second base station instead of the first base station upon said registering of the mobile station as present in the vicinity of the mobile station presence detector; and a handing off section configured to hand off the mobile station to a second radio channel for communication of control information and user data information between the second base station and the mobile station, subsequent to determining if the mobile station is included in said set of mobile stations.

11. A radio communication system according to claim 10 wherein:

said first base station belongs to a public cellular network, said second base station is a home base station connected to a public wireline network, and that said register and said determination unit are included in said home base station.

12. A radio communication system according to claim 10 wherein said first base station belongs to a public cellular network, said second base station belongs to a wireless office system and said register and said determination unit are included in said wireless office system.

* * * * *